(12) United States Patent
Hou et al.

(10) Patent No.: US 11,796,700 B2
(45) Date of Patent: Oct. 24, 2023

(54) USING NEURAL NETWORKS FOR INTERPOLATING SEISMIC DATA

(71) Applicant: CGG SERVICES SAS, Massy (FR)

(72) Inventors: Song Hou, Crawley (GB); Peng Zhao, Fornebu (NO)

(73) Assignee: CGG SERVICES SAS, Massy (FR)

( * ) Notice: Subject to any disclaimer, the term of this patent is extended or adjusted under 35 U.S.C. 154(b) by 0 days.

(21) Appl. No.: 17/497,312

(22) Filed: Oct. 8, 2021

(65) Prior Publication Data

US 2023/0114602 A1    Apr. 13, 2023

(51) Int. Cl.
*G01V 1/36*    (2006.01)

(52) U.S. Cl.
CPC ........ *G01V 1/362* (2013.01); *G01V 2210/322* (2013.01); *G01V 2210/512* (2013.01); *G01V 2210/57* (2013.01)

(58) Field of Classification Search
None
See application file for complete search history.

(56) References Cited

PUBLICATIONS

Kuijpers, Dieuwertje, Ivan Vasconcelos, and Patrick Putzky. "Reconstructing missing seismic data using Deep Learning." arXiv preprint arXiv:2101.09554 (Year: 2021).*

Kong, Fantong, Picetti, Francesco, Lipari, Vincenzo, Bestagini, Paolo, and Stefano Tubaro. "Deep prior-based seismic data interpolation via multi-res U-net." Paper presented at the SEG International Exposition and Annual Meeting, Virtual, Oct. 2020. doi: https://doi.org/10.1190/segam2020-3426173.1 (Year: 2020).*

Mandelli, Sara, et al. "Interpolation and denoising of seismic data using convolutional neural networks." arXiv preprint arXiv: 1901.07927 (Year: 2019).*

C. Peng et al., "Cooperative Noise Attenuation in a Complex Wavelet Domain," 76th EAGE Conference & Exhibition 2014 Amsterdam RAI, The Netherlands, Jun. 16-19, 2014, Th ELI1 03, 5 pages.

Olaf Ronneberger et al., "U-Net: Convolutional Networks for Biomedical Image Segmentation," Computer Science Department and BIOSS Centre for Biological Signalling Studies, University of Freiburg, Germany, May 18, 2015, 8 pages.

S. Hou et al., "Learn to Invert: Surface Wave Inversion with Deep Neural Network," 81st EAGE Conference & Exhibition 2019—Workshop Program, Jun. 3-6, 2019, London, UK, WS10_02, 5 pages.

(Continued)

*Primary Examiner* — Lina Cordero
(74) *Attorney, Agent, or Firm* — PATENT PORTFOLIO BUILDERS PLLC (57) ABSTRACT

One method interpolates simulated seismic data of a coarse spatial sampling to a finer spatial sampling using a neural network. The neural network is previously trained using a set of simulated seismic data with the finer spatial sampling and a subset thereof with the coarse spatial sampling. The data is simulated using an image of the explored underground formation generated using real seismic data. The seismic dataset resulting from simulation and interpolation is used for denoising the seismic data acquired over the underground formation. Another method demigrates seismic data at a sparse density and then increases density by interpolating traces using a neural network.

18 Claims, 7 Drawing Sheets

(56) References Cited

PUBLICATIONS

S. Hou et al., "Seismic Processing with Deep Convolutional Neural Networks: Opportunities and Challenges," 82nd EAGE Conference & Exhibition 2020, Dec. 8-11, 2020, Amsterdam, The Netherlands, Th_Forum_17, 5 pages.

Shan Qu et al., "Training deep networks with only synthetic data: Deep-learning-based near-offset reconstruction for (closed-loop) surface-related multiple estimation on shallow-water field data," Geophysics, May-Jun. 2021, pp. A39-A43, vol. 86, No. 3.

Thomas Andre Larsen Greiner et al., "Cross-streamer wavefield reconstruction through wavelet domain learning," Geophysics, Nov.-Dec. 2020, pp. V457-V471, vol. 85, No. 6.

Thomas Larsen Greiner et al., "Cross-streamer wavefield interpolation using deep convolutional neural network," 2019 SEG, SEG International Exposition and 89th Annual Meeting, 2019, pp. 2207-2211.

Wenqian Fang et al., "Seismic data interpolation based on U-net with texture loss," Geophysics, Jan.-Feb. 2021, pp. V41-V54, vol. 86, No. 1.

Yingying Wang et al., "Seismic trace interpolation for irregularly spatial sampled data using convolutional autoencoder," Geophysics, Mar.-Apr. 2020, pp. V119-V130, vol. 85, No. 2.

\* cited by examiner

USING NEURAL NETWORKS FOR INTERPOLATING SEISMIC DATA

TECHNICAL FIELD

Embodiments of the subject matter disclosed herein generally relate to methods and systems that perform seismic data processing using neural networks (NN); more particularly, to using NN for interpolating seismic data used for denoising.

DISCUSSION OF THE BACKGROUND

Seismic exploration uses seismic waves to probe underground formations. The seismic waves injected into an underground formation are detected after traveling therethrough. Detected waves that are recorded as seismic data (amplitude versus time pairs associated with a receiver) carry structural information about the layers they crossed, the location of interfaces between underground formation's layers, waves attenuation, etc. However, besides the sought-after information-carrying signal, seismic data is also affected by noise, characteristics of the seismic wave's source and receiver, etc. Seismic processing tries to remove "coherent" noise (like multiple reflections and all other predictable aspects aliasing the acquired data) and to demigrate from detection locations to locations inside the underground formation converting the amplitude-time pairs into a three-dimensional (3D) representation (image) of the underground formation's structure. All the intertwined aspects affecting seismic data render its processing highly complex.

Seismic data is often acquired with a coarser than desirable and irregular spatial sampling. This suboptimal spatial sampling causes spatial aliasing problems for many processing steps, which may lead to a poor final structural image. To overcome this problem, interpolation is routinely applied to densify traces. Note that a trace is a series of amplitude time pairs recorded by a following a shot (i.e., seismic wave emission). A dataset is made of traces at sampling locations. Interpolation of traces represents a classic under-determined inverse problem, especially for the spatially aliased energy (i.e., dipping event at higher frequencies). A key aspect of any interpolation algorithm is how to impose certain constraints or assumptions for this ill-posed problem.

Recently, artificial intelligence, machine learning and, more specifically, neural networks have started being used in seismic processing (as described, for example, in the 2019 article "Learn to invert: surface wave inversion with deep neural network" by Hou et al., published in 81*st EAGE Conference & Exhibition*, Extended Abstracts, and the 2020 article "Seismic processing with deep convolutional neural networks: opportunities and challenges" by Hou S. and Hoeber H., published in 82*nd EAGE Annual Conference & Exhibition*, Extended Abstracts). These articles are incorporated herein by references in their entirety.

Moreover, in the seismic processing flow, geophysicists often need to simulate seismic data. These simulations may be wave equation-based or ray-based. The simulated data is used for some specific tasks, such as guided denoise, primary protection, etc. However, simulating seismic data can be a computationally intensive task and may also introduce artefacts.

There is a need to continue improving the efficiency and accuracy of interpolating traces for both real and simulated data.

SUMMARY

Methods and apparatuses according to various embodiments train a neural network using a dataset with dense traces and a subset thereof and then use the trained neural network to add traces by interpolation into other datasets of the same kind as the dataset used for training but with a coarse or irregular initial spatial sampling.

According to an embodiment, there is a method for exploring an underground formation. The method includes generating a first simulated dataset with a first spatial sampling using an image of the underground formation and training a NN to output the first simulated dataset upon receiving as input a subset thereof having a second spatial sampling coarser than the first spatial sampling. The method further includes generating a simulated second dataset with the second spatial sampling using the image, obtaining a second dataset with the first spatial sampling by inputting the simulated second dataset to the trained NN, and using the second dataset to denoise seismic data.

According to another embodiment, there is another method for exploring an underground formation including merging pre-stack migration, PSM, stacked data acquired using ocean bottom nodes, OBNs, and PSM stacked data acquired using towed streamers, to obtain merged PSM stacked data. This method further includes demigrating the merged PSM stacked data to obtain a sparse demigrated dataset, generating a demigrated-interpolated dataset by inputting the sparse demigrated dataset to a NN trained to densify traces by interpolation, and performing guided denoising of seismic data acquired using the OBNs and the towed streamers using the demigrated-interpolated dataset.

According to yet another embodiment, there is a seismic data processing apparatus having an interface configured to obtain seismic data acquired over an explored underground formation and a data processing unit connected to the interface. The data processing unit is configured to generate a first simulated dataset with a first spatial sampling using an image of the underground formation, to train a NN to output the first simulated dataset upon receiving as input a subset thereof having a second spatial sampling coarser than the first spatial sampling, to generate a simulated second dataset with the second spatial sampling using the image, to obtaining a second dataset with the first spatial sampling by inputting the simulated second dataset to the trained NN, and to use the second dataset to denoise the seismic data.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places is not necessarily referring to the same embodiment. Further, the particular features, structures or characteristics may be combined in any suitable manner in one or more embodiments.

The embodiments described in this section use neural networks (NNs) to densify traces in seismic data. This approach increases the processing efficiency and accuracy of the simulated and real data. The NN is trained using a set of seismic data with fine spatial sampling and a subset thereof with coarse spatial sampling. One or more datasets with coarse spatial sampling are then input to the trained NN to obtain corresponding datasets with fine spatial sampling. The datasets output by the NN are used for denoising the acquired seismic data. The set of simulated seismic data used for training and the one or more simulated datasets with coarse spatial sampling may be simulated using an image of the underground formation based on the acquired seismic data (e.g., a reflectivity image obtained by demigrating seismic data, a velocity and/or density image based on data, etc.).

A NN is an interconnected group of nodes that use a mathematical model based on a connectionistic approach to computation for data processing. NNs are first trained as they are adaptive systems able to change their structure between inputs and outputs to achieve a predetermined outcome based on the flows therethrough. NNs model complex relationships between inputs and outputs in a training phase and then use the models when receiving as input data other than the training data. NNs are particularly useful in applications, such as seismic data processing, where the complexity of the data makes modeling such relationships by other means impractical.

There are different types of NNs, but a NN always consists of the same components: neurons (i.e., nodes where different incoming data are combined), synapses (links enabling data to flow between nodes, inputs and nodes, or nodes and outputs), weights (applied to data flowing on synapses), biases (similar to the weights, but associated to decisions rather than value-yielding processing), and functions (executed in the nodes). A deep neural network (DNN) is a NN with multiple layers of neurons between input and output. A convolutional neural network (CNN) is a class of NN frequently used to analyze images (such as the ones resulting in seismic data processing); in CNNs, each neuron (known as "perceptron") of one layer is connected to each neuron of a next layer. Although the NNs employed in the embodiments described hereinafter may be DNN, CNN or DCNN, the broader term NN will be used.

Figure 1:
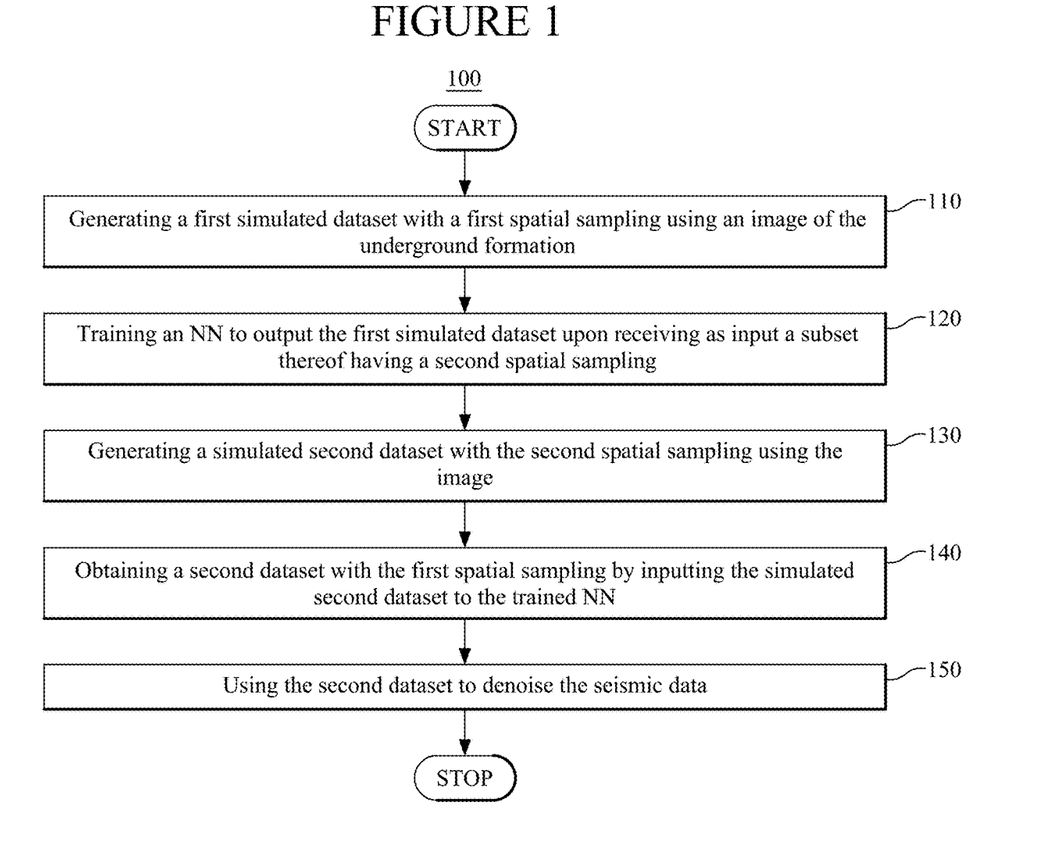
FIG. 1 is a flowchart of a method according to an embodiment.

FIG. 1 is a flowchart of a method 100 for exploring an underground formation according to an embodiment. Method 100 includes generating a first simulated dataset with a first spatial sampling using an image of the underground formation at 110. The image may be obtained from seismic data acquired over the underground formation by marine towed streamer, ocean bottom nodes/cables, land survey, or any types of seismic survey. The term "spatial sampling" may refer to a regular two-dimensional (2D) grid, to a receiver arrangement of another survey in case of a time lapse analysis, etc. The first simulated dataset may correspond to a first portion of seismic data acquired over the underground formation, that is, the first simulated dataset and the first portion of seismic data first portion of seismic data span the same area.

Method 100 then includes training a NN to output the first simulated dataset upon receiving as input a subset thereof having a second spatial sampling at 120. The subset may also correspond to the first portion of seismic data. The second spatial sampling is inherently coarser than the first spatial sampling because a subset includes less traces than the entire first simulated dataset. For example, if the first simulated dataset is characterized by a first trace interval on one (or both) direction(s), the subset may be obtained by dropping traces (e.g., every other trace, or two out of every three, etc.) to achieve a second trace interval for the subset. In other words, the subset may be obtained by selecting one trace from every N consecutive traces in one dimension, with N larger than 2 and smaller than, for example, 10. Different selection ratios may be used on different dimensions (e.g., selecting every other trace in x-direction, and one out of every three in y direction, or selecting every other trace in x-direction while keeping all traces in y-direction).

Method 100 further includes generating a simulated second dataset with the second spatial sampling using the image, at 130. The simulated second dataset may correspond to another portion of the seismic data than the first simulated dataset. The second spatial sampling is the coarser spatial sampling of the subset. Simulating seismic data is substantially more time-consuming than interpolating data. Therefore, simulating all necessary data is replaced in method 100 with simulating on a coarse spatial sampling and then interpolating the simulated data to densify the traces to the targeted, first, finer spatial sampling.

Method 100 then includes obtaining a second dataset with the first spatial sampling by inputting the simulated second dataset to the trained NN, at 140. The first spatial sampling is the desired, targeted, finer spatial sampling. Steps 130-140 may be repeated for different portions of the seismic data to obtain a simulated-interpolated dataset corresponding to the entire seismic data acquired during a survey or covering an area of interest. The second dataset output by the trained NN includes both simulated and interpolated traces. Method 100 then includes using the second dataset with the first (finer) spatial sampling to denoise seismic data, at 150. Since the second dataset contains the simulated signal without noise, it can guide removal of the noise from the real data. More specifically, the signal in the real seismic data should be similar to the second dataset with the first spatial sampling. By using the second dataset as a guide, removal of real signal from the acquired seismic data is avoided (as discussed, for example, in the 2014 article "Cooperative Noise Attenuation in a Complex Wavelet Domain" by C. Peng and R. Huang presented at the 76th EAGE Conference & Exhibition, which is incorporated herein by reference in its entirety).

In one embodiment, the first simulated dataset that is used for training corresponds to a first offset class (i.e., a first range of source-receiver distances), and the second simulated dataset corresponds to a second offset class (or even all other offset classes). In another embodiment, the first simulated dataset corresponds to one seismic wave frequency and the second simulated dataset corresponds to one or more other frequencies.

In one embodiment, the NN interpolates two spatial directions simultaneously time looping over time slices. In another embodiment, NNs may operate directly on 3D cubes of data. Interpolation may also be only in one direction.

In an embodiment, considering ocean bottom nodes (OBN) or land data acquisition with fixed lines of receivers, a spatial sampling characterized by an interval in x direction and an interval in y direction makes a three-dimensional (3D) NN model necessary. The 3D NN training process converges slower and it is less stable than for two dimensional (2D) NN. Therefore, a dual directional 2D NN approach may be used to interpolate 3D data.

Figure 2:
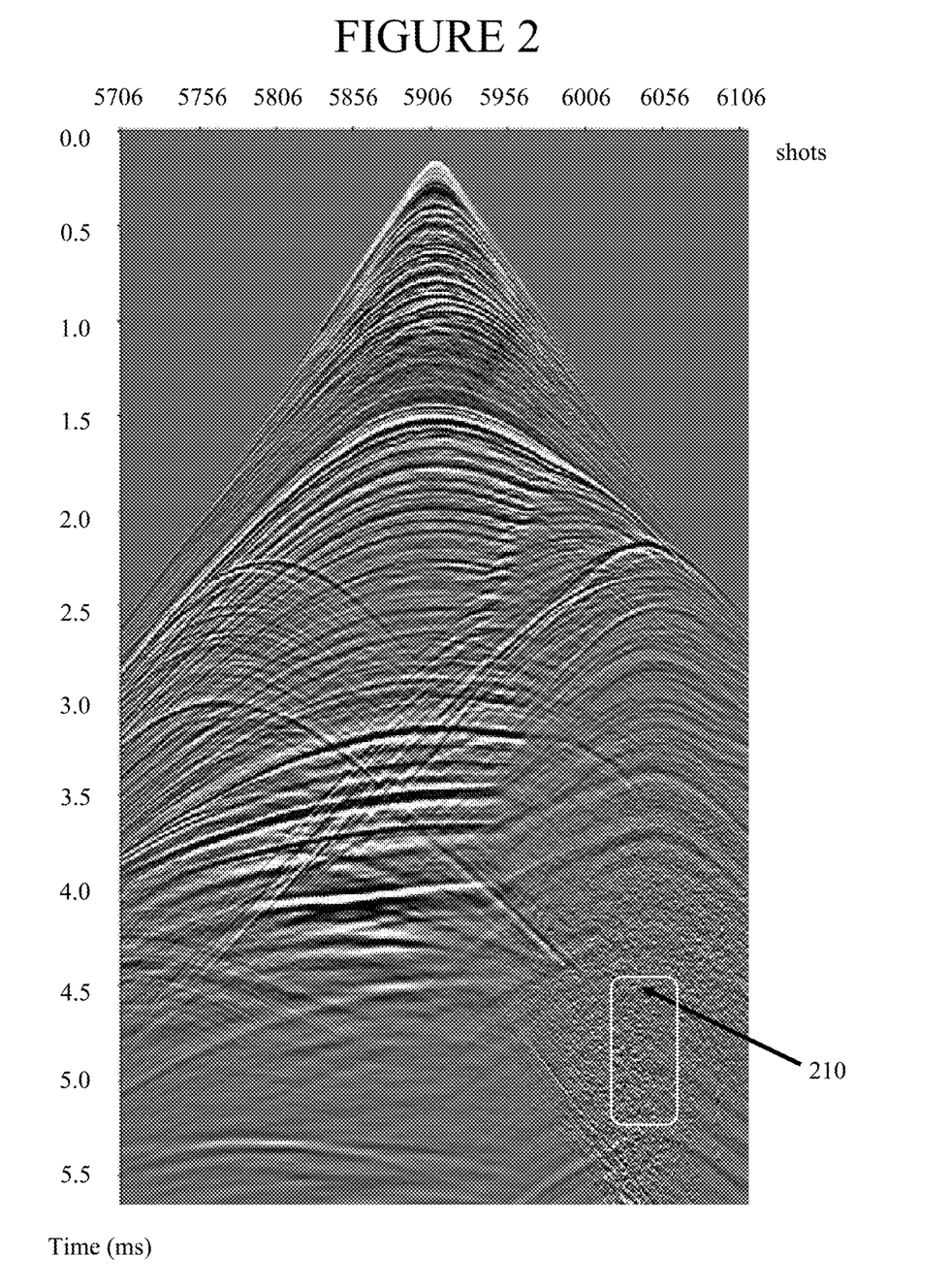
FIG. 2 illustrates a demigrated receiver gather.

FIG. 2 illustrates a demigrated receiver gather with time increasing downwards and shotpoint numbers represented on the horizontal axis, detected amplitudes being illustrated as nuances of gray. The aim is, for example, to interpolate the original shot sampling to a denser grid to be used for guided denoise. The known reflectivity may be used to demigrate to the denser grid, but such an approach is prohibitively expensive computationally. Instead coarse shot grid is demigrated and then a DNN is used to interpolate the demigration results to the desired denser grid that is going to be employed in the guided denoise.

The shorter first arrival times correspond to near offsets. The gather represents denser data shot grid (obtained via coarse grid demigration and then interpolation). Note that, in FIG. 2, the area labeled 210 is noisy due to diffractions beneath a salt body that lacks reflectivity.

Figure 3:
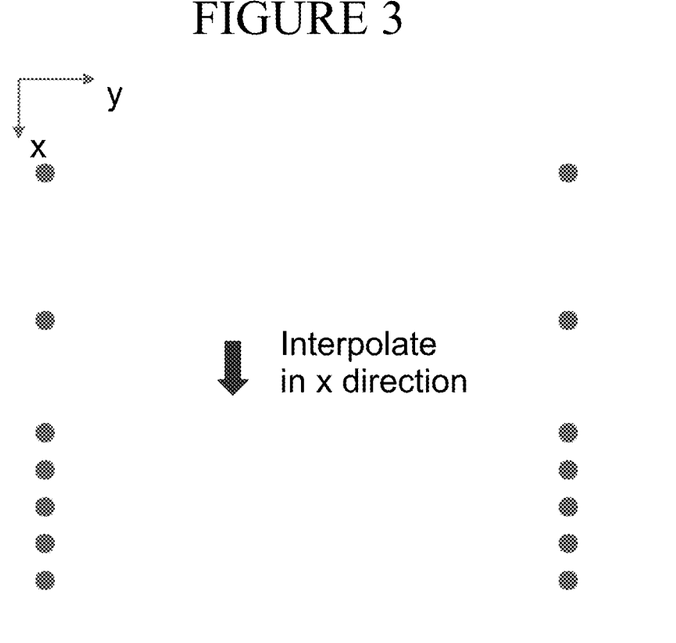
FIG. 3 illustrates a first interpolation according to an embodiment.
Figure 4:
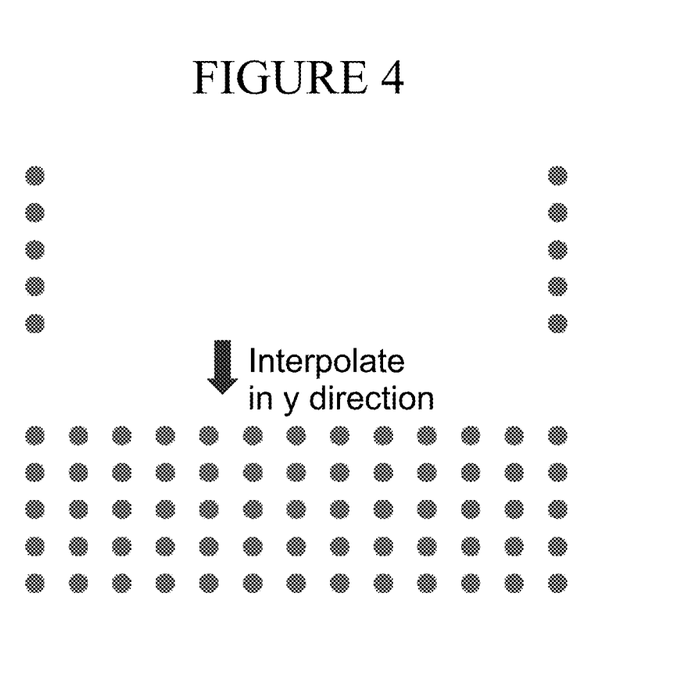
FIG. 4 illustrates a second interpolation according to an embodiment.

In one embodiment, first, a single-layer-input interpolation adds traces on x-direction to generate a dataset with the desired spatial sampling in the x direction, as illustrated in FIG. 3. Then, a multi-layer-input interpolation in the y-direction is performed to generate a dataset with the desired spatial sampling of the denser grid from the dataset with the desired spatial sampling in x direction but initially a coarser sampling in y direction, as illustrated in FIG. 4. Unlike the single-layer input interpolation, in the multi-layer input interpolation the values of newly interpolated traces depend not only on the end-of-line traces along a respective x-line, but on all traces detected and interpolated traces known at the beginning of the y-direction interpolation.

Figure 5:
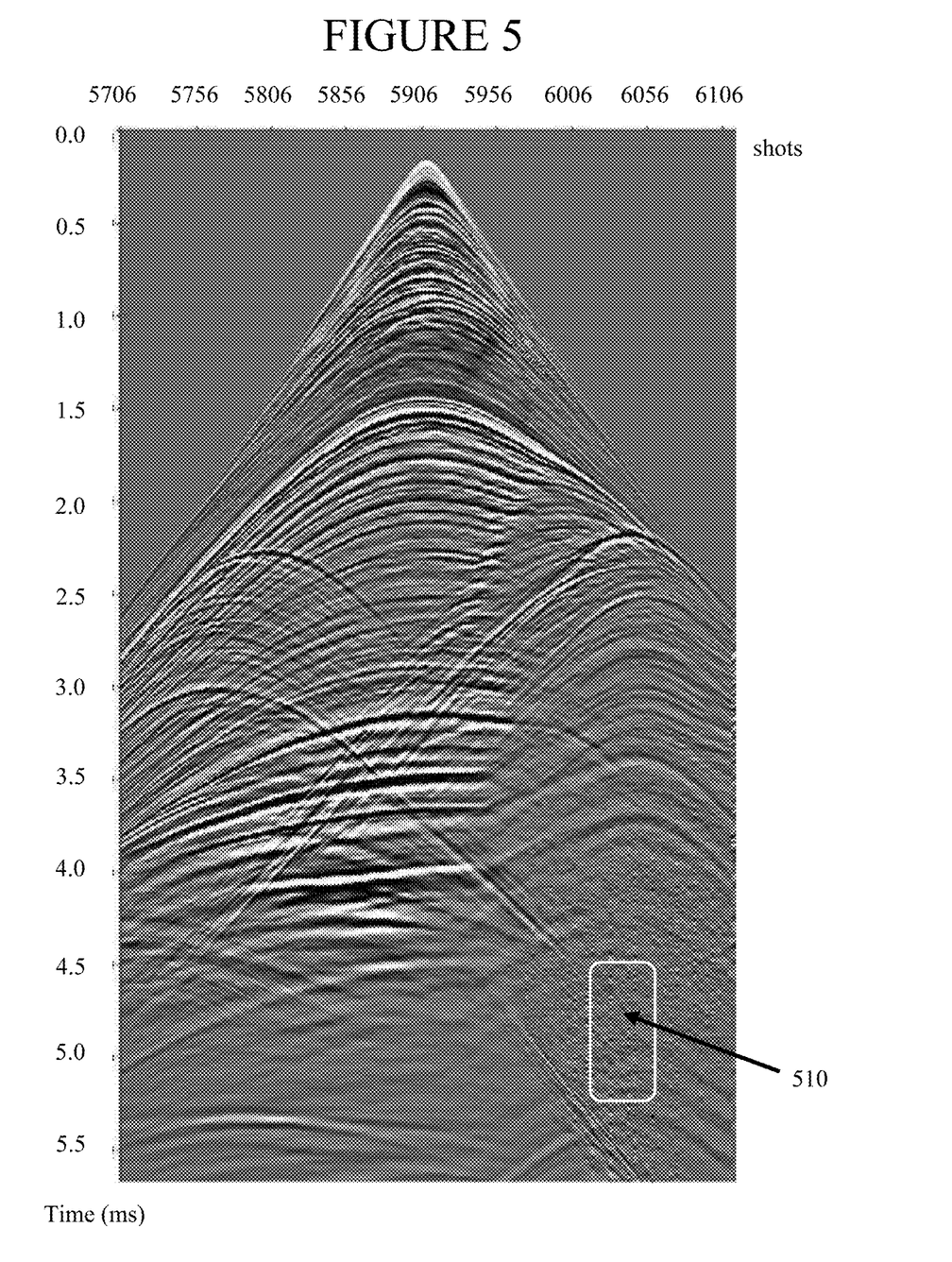
FIG. 5 illustrates the receiver gather in FIG. 2 after interpolation.

FIG. 5 illustrates the demigrated gather in FIG. 2 using the interpolated dataset output by the trained NN. Note that, in FIG. 5, area 510 beneath the salt body is cleaner after interpolation.

Figure 6:
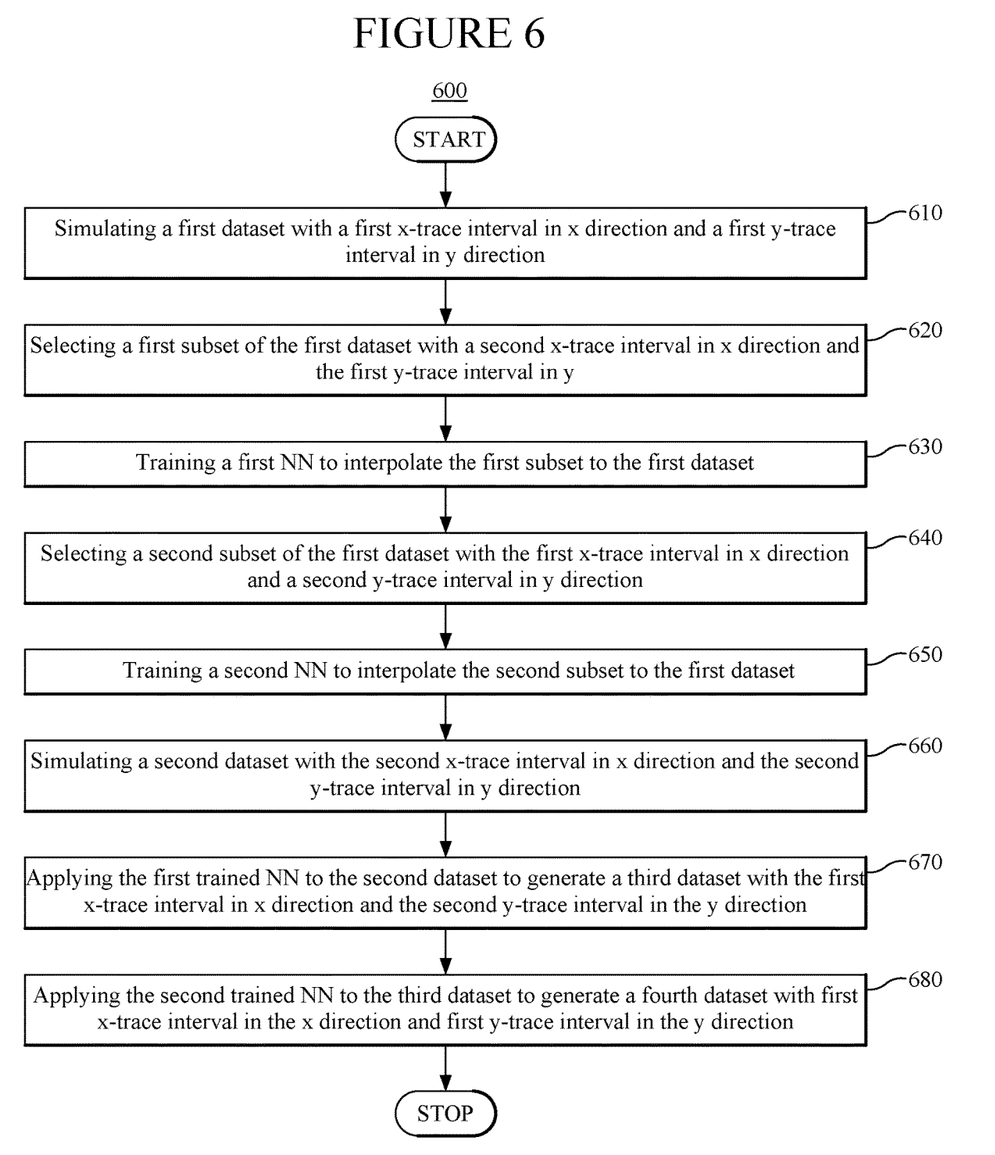
FIG. 6 illustrates a flowchart of a method according to an embodiment.

FIG. 6 is a flowchart of a method 600 for exploring an underground formation according to another embodiment. Method 600 includes simulating a first dataset with a first x-trace interval in x direction and a first y-trace interval in y direction at 610. The method further includes selecting a first subset of the first dataset with a second x-trace interval in x direction and the first y-trace interval in y direction at 620. Method 600 then includes training a first NN to interpolate the first subset to the first dataset at 630.

Method 600 then includes selecting a second subset of the first dataset with the first x-trace interval in x direction and a second y-trace interval in y direction at 640 and training a second NN to interpolate the second subset to the first dataset at 650.

Method 600 then includes simulating a second dataset with the second x-trace interval in x direction and the second y-trace interval in y direction at 660, applying the first trained NN to the second dataset to generate a third dataset with the first x-trace interval in x direction and the second y-trace interval in the y direction at 670, and then applying the second trained NN to the third dataset to generate a fourth dataset with the first x-trace interval in the x direction and the first y-trace interval in the y direction at 680.

The second and fourth datasets correspond to a different portion of the acquired seismic data than the first dataset used for training (e.g., different offset class, different wave frequency, different area, etc.). The first x-trace interval is smaller than the second x-trace interval, and the first y-trace interval is smaller than the second y-trace interval.

Figure 7:
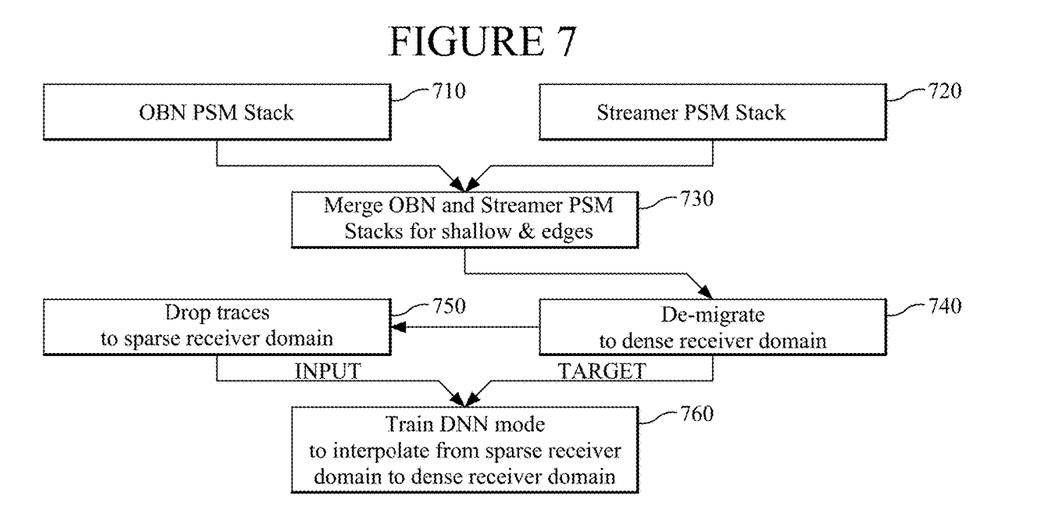
FIG. 7 illustrates training a neural network according to another embodiment.

In yet another embodiment illustrated in FIG. 7, OBN pre-stack migration (PSM) stacked seismic data is merged with streamer PSM stacked seismic data acquired with towed streamers that may have variable depth (hereinafter named "streamer PSM stacks"). For training, OBN PSM seismic data stacks 710 merged at 730 with streamer PSM stacks 720 are demigrated at 740 to achieve a dataset dense in the receiver domain. The goal is to simulate the signal in a domain in which the real data is acquired, which is the receiver domain. "Receiver domain" views a collection of actuating shot locations as recorded by a stationary receiver. This method can be used in other domains than receiver domain, for example, shot domain, common offset domain, cross-spread domain, common-offset vector domain. The demigrated data can be generated based on either wave equation modelling or ray tracing.

A subset of the demigrated dataset is created at 750 by dropping traces so that the subset to be sparse in receiver domain. A NN is trained at 760 to interpolate the subset to the dataset (i.e., from sparse to dense in receiver domain).

Figure 8:
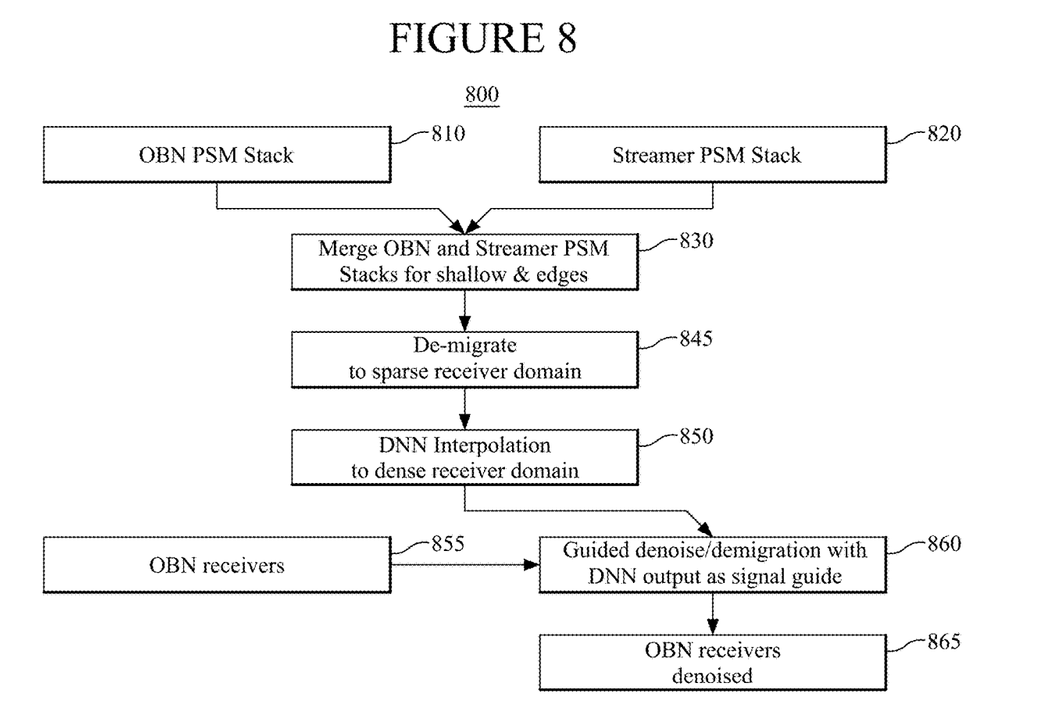
FIG. 8 illustrates using a trained neural network to perform guided denoising according to an embodiment.

FIG. 8 illustrates using the trained NN to interpolate data other than the training data. The training data 710 and 720 is a small yet representative fraction of the entire available seismic data. Other portions of the seismic data, that is, OBN PSM seismic data stacks 810 and streamer PSM stacks 820 are merged at 830. The resulting merged seismic dataset is demigrated at 845 to achieve a sparse demigrated dataset in the receiver domain. The sparse demigrated dataset is input to the trained NN for interpolation to obtain a demigrated-interpolated dataset with the same coverage as the sparse demigrated dataset but dense in receiver domain, at 850. Interpolation improves computational efficiency, reducing 16 times the runtime compared with denigrating the merged seismic dataset to be dense in receiver domain. At 860, the demigrated-interpolated dataset output by the NN is used to guide denoising at OBN receiver locations 855, yielding denoised data 865 for the OBN receivers.

Figure 9:
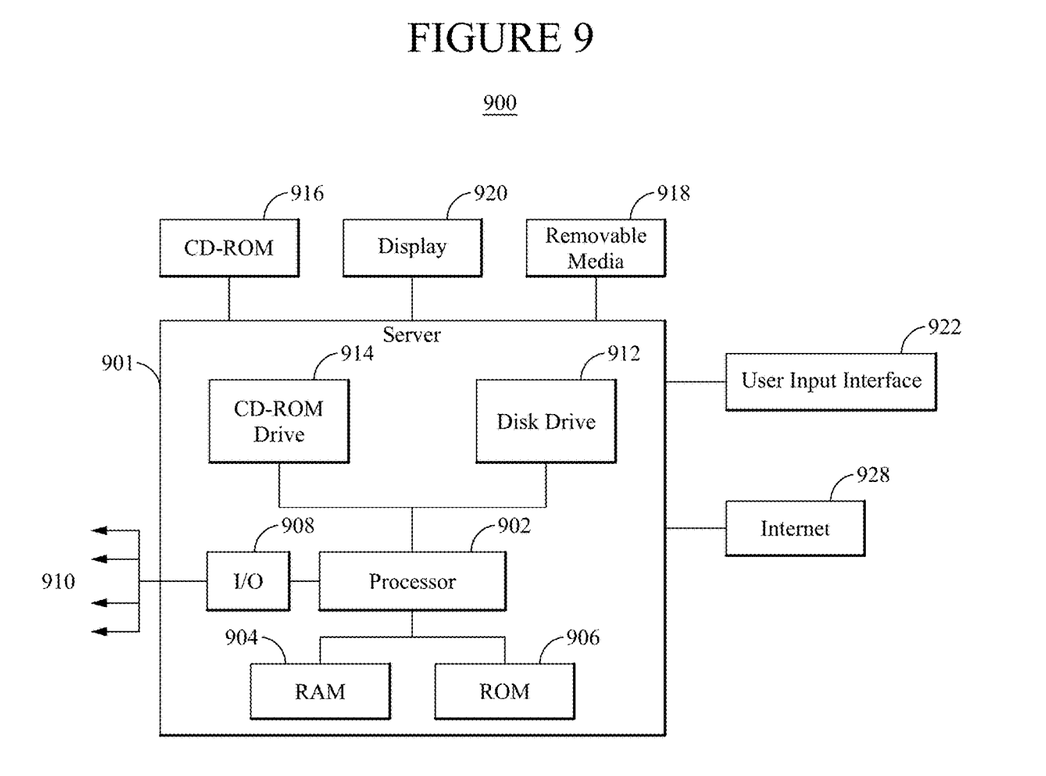
FIG. 9 is a schematic diagram of a data processing apparatus according to an embodiment.

The above-discussed methods may be implemented in a computing device 900 as illustrated in FIG. 9. Hardware, firmware, software or a combination thereof may be used to perform the various steps and operations described herein.

Exemplary computing device 900 suitable for performing the activities described in the exemplary embodiments may include a server 901. Server 901 may include a central processor (CPU or GPU) 902 coupled to a random-access memory (RAM) 904 and to a read-only memory (ROM) 906. ROM 906 may also be other types of storage media to store programs, such as programmable ROM (PROM), erasable PROM (EPROM), etc. Processor 902 may communicate with other internal and external components through input/output (I/O) circuitry 908 and bussing 910 to provide control signals and the like. Processor 902 carries out a variety of functions as are known in the art, as dictated by software and/or firmware instructions.

Server 901 may also include one or more data storage devices, including disk drives 912, CD-ROM drives 914 and other hardware capable of reading and/or storing information, such as DVD, etc. In one embodiment, software for carrying out the above-discussed steps may be stored and distributed on a CD-ROM or DVD 916, a USB storage device 918 or other form of media capable of portably storing information. These storage media may be inserted into, and read by, devices such as CD-ROM drive 914, disk drive 912, etc. Server 901 may be coupled to a display 920, which may be any type of known display or presentation screen, such as LCD, plasma display, cathode ray tube (CRT), etc. A user input interface 922 is provided, including one or more user interface mechanisms such as a mouse, keyboard, microphone, touchpad, touch screen, voice-recognition system, etc.

Server 901 may be coupled to other devices, such as sources, detectors, etc. The server may be part of a larger network configuration, as in a global area network such as the Internet 928, which allows ultimate connection to various computing devices.

The embodiments described in this section provide methods and apparatuses that use at least one NN to interpolate seismic data. It should be understood that this description is not intended to limit the invention. On the contrary, the exemplary embodiments are intended to cover alternatives, modifications and equivalents, which are included in the spirit and scope of the invention. Further, in the detailed description of the exemplary embodiments, numerous specific details are set forth in order to provide a comprehensive understanding of the invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein. This written description uses examples of the subject matter disclosed to enable any person skilled in the art to practice the same, including making and using any devices or systems and performing any incorporated methods. Other examples that occur to those skilled in the art are intended to be within the scope of the disclosed inventions.

What is claimed is:

1. A method for exploring an underground formation, the method comprising:
   generating a first simulated dataset with a first spatial sampling using an image of the underground formation;
   training a neural network, NN, to output the first simulated dataset upon receiving as input a subset thereof having a second spatial sampling coarser than the first spatial sampling, the subset being obtained by selecting one trace from every N consecutive traces in one dimension, with N larger than 2 and smaller than 10;
   generating a second simulated dataset with the second spatial sampling using the image;
   obtaining a second dataset with the first spatial sampling by inputting the second simulated dataset to the trained NN; and
   using the second dataset to denoise seismic data.

2. The method of claim 1, wherein the image of the underground formation is a reflectivity image based on the seismic data.

3. The method of claim 1, wherein the first simulated dataset and the subset correspond to a first portion of the seismic data acquired over the underground formation, and the second simulated dataset corresponds to a second portion of the seismic data other than the first portion.

4. The method of claim 1, wherein the first spatial sampling and the second spatial sampling are rectangular grids.

5. The method of claim 4, wherein the NN consists of an x-direction-interpolating NN followed by a y-direction-interpolating NN, the x-direction-interpolating NN being trained with a first subset of the first simulated dataset, the first subset being selected to have a smaller x-trace interval on an x-direction than the first simulated dataset, and the y-direction-interpolating NN being trained with a second subset of the first simulated dataset, the second subset being selected to have a smaller y-trace interval on a y-direction than the first simulated dataset.

6. The method of claim 4, wherein the NN performs a single-layer x-direction-interpolation followed by a multi-layer y-direction-interpolation.

7. A method for exploring an underground formation, the method comprising:
   merging pre-stack migration, PSM, stacked data acquired using ocean bottom nodes, OBNs, and PSM stacked data acquired using towed streamers to obtain merged PSM stacked data;
   demigrating the merged PSM stacked data to obtain a sparse demigrated dataset;
   generating a demigrated-interpolated dataset by inputting the sparse demigrated dataset to a neural network, NN, trained to densify traces by interpolation; and
   performing guided denoising of seismic data acquired using the OBNs and the towed streamers using the demigrated-interpolated dataset.

8. The method of claim 7, further comprising:
   merging training pre-stack migration, PSM, stacked data acquired using the OBNs and training PSM stacked data acquired using the towed streamers to obtain training merged PSM stacked data;
   demigrating the training merged PSM stacked data to obtain a dense training demigrated dataset;
   selecting a subset of the dense training demigrated dataset to have a coarser spatial sampling than the dense training demigrated dataset; and
   training the NN to output the demigrated-interpolated dataset upon receiving the subset as input.

9. A seismic data processing apparatus comprising:
   an interface configured to obtain seismic data acquired over an explored underground formation; and
   a data processing unit connected to the interface and configured:
      to generate a first simulated dataset with a first spatial sampling using an image of the explored underground formation;
      to train a neural network, NN, to output the first simulated dataset upon receiving as input a subset thereof having a second spatial sampling coarser than the first spatial sampling, wherein the subset is obtained by selecting a trace from every N consecutive traces in one dimension, with N larger than 2 and smaller than 10;
      to generate a second simulated dataset with the second spatial sampling using the image;
      to obtain a second dataset with the first spatial sampling by inputting the second simulated dataset to the trained NN; and
      to use the second dataset to denoise the seismic data.

10. The seismic data processing apparatus of claim 9, wherein the image of the explored underground formation is a reflectivity image based on the seismic data.

11. The seismic data processing apparatus of claim 9, wherein the first simulated dataset and the subset correspond to a first portion of the seismic data acquired over the explored underground formation, and the second simulated dataset corresponds to a second portion of the seismic data other than the first portion.

12. The seismic data processing apparatus of claim 9, wherein the first spatial sampling and the second spatial sampling are rectangular grids.

13. The seismic data processing apparatus of claim 12, wherein the NN consists of an x-direction-interpolating NN followed by a y-direction-interpolating NN, the x-direction-interpolating NN being trained with a first subset of the first simulated dataset, the first subset being selected to have a smaller x-trace interval on an x-direction than the first simulated dataset, and the y-direction-interpolating NN being trained with a second subset of the first simulated dataset, the second subset being selected to have a smaller y-trace interval on a y-direction than the first simulated dataset.

14. The seismic data processing apparatus of claim 12, wherein the NN is configured to perform a single-layer x-direction-interpolation followed by a multi-layer y-direction-interpolation.

15. The seismic data processing apparatus of claim 9, wherein
 the seismic data includes data acquired using ocean bottom nodes, OBNs, and data acquired using towed streamers; and
 the data processing unit is further configured:
  to merge pre-stack migration, PSM, stacked data acquired using the OBNs and PSM stacked data acquired using the towed streamers to obtain merged PSM stacked data;
  to demigrate the merged PSM stacked data to obtain a sparse demigrated dataset;
  to generate a demigrated-interpolated dataset by inputting the sparse demigrated dataset to the NN trained to densify traces by interpolation; and
  to perform a guided denoise of the seismic data acquired using the OBNs and the towed streamers using the demigrated-interpolated dataset.

16. The seismic data processing apparatus of claim 15, wherein the data processing unit is further configured:
 to merge training PSM stacked data acquired using the OBNs and training PSM stacked data acquired using the towed streamers to obtain training merged PSM stacked data;
 to demigrate the training merged PSM stacked data to obtain a dense training demigrated dataset;
 to select a subset of the dense training demigrated dataset to have a coarser spatial sampling than the dense training demigrated dataset; and
 to train the NN to output the demigrated-interpolated dataset upon receiving the subset as input.

17. The seismic data processing apparatus of claim 9, further comprising:
 a memory storing executable codes that, when executed by the data processing unit make the data processing unit to generate the first simulated dataset, to train the NN, to generate the second simulated dataset, to obtain the second dataset and to denoise the seismic data using the second dataset.

18. The seismic data processing apparatus of claim 9, further comprising:
 a record drive configured to read executable codes non-transitorily stored on computer readable recording media, which executable codes make the data processing unit to generate the first simulated dataset, to train the NN, to generate the second simulated dataset, to obtain the second dataset and to denoise the seismic data using the second dataset.

\* \* \* \* \*